Patented June 29, 1937

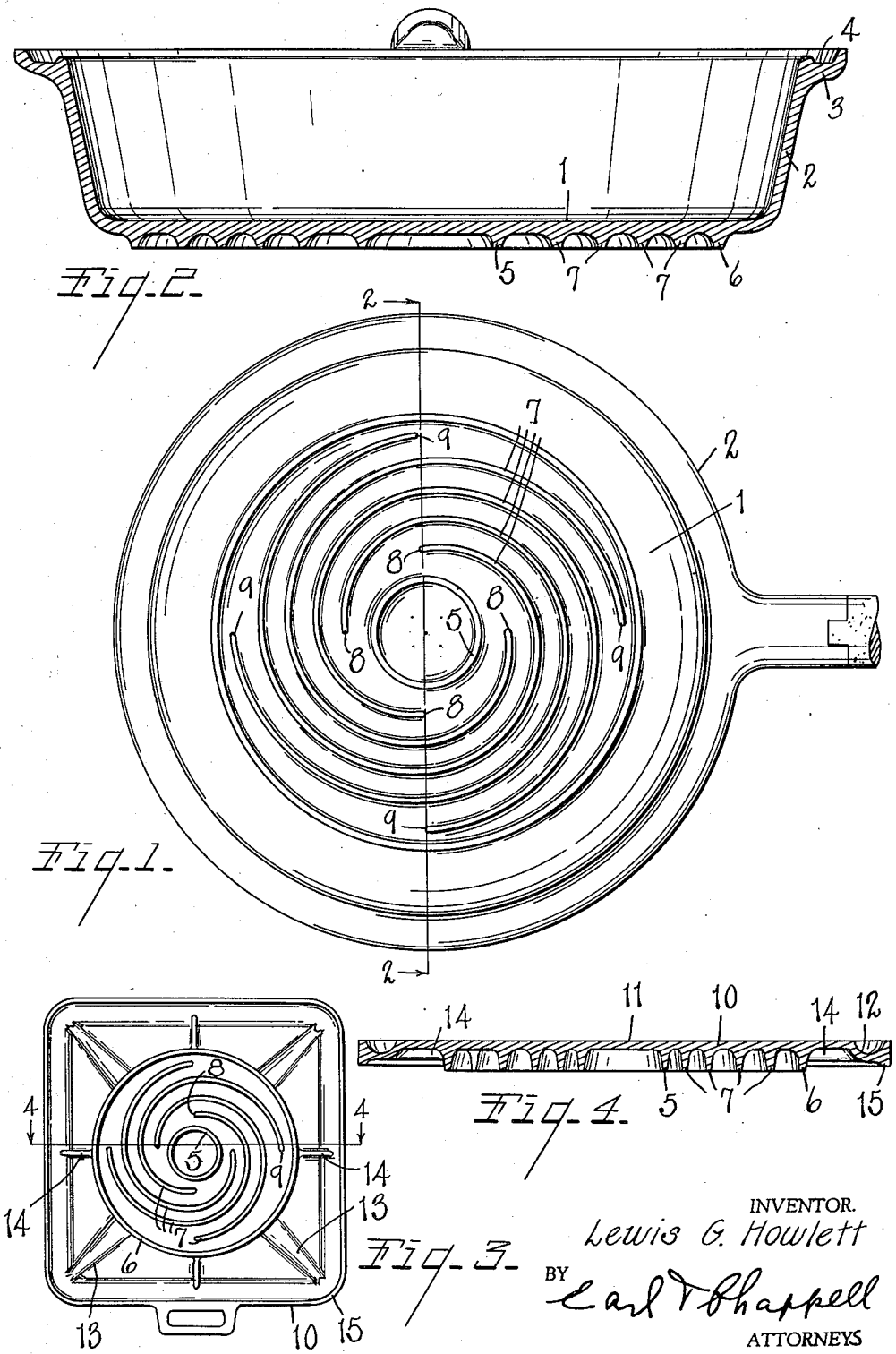

2,085,220

UNITED STATES PATENT OFFICE 2,085,220

COOKING UTENSIL

Lewis G. Howlett, Hartford, Mich., assignor to Cookware Company of America, Hartford, Mich.

Application December 21, 1936, Serial No. 117,015

8 Claims. (Cl. 53—1)

The main objects of this invention are:

First, to provide a cooking utensil of aluminum or aluminum alloys in which the bottom is so reinforced as to prevent buckling and warping in use.

Second, to provide a cooking utensil in which there is a very uniform distribution of heat throughout the bottom of the utensil thereby avoiding hot spots and minimizing scorching and burning.

Third, to provide a cooking utensil which is highly efficient in the absorption of heat units from the heat source especially when the source is a gas or electric burner.

Fourth, to provide a cooking utensil in which the bottom is so designed as not only to uniformly distribute the heat throughout the bottom but also to materially increase the heating area and the heat absorbing capacity.

Fifth, to provide a cooking utensil having a ribbed bottom the ribs of which are uniformly disposed and greatly reinforce the bottom, and at the same time do not interfere with the effective cleaning of the bottom.

Objects relating to details and economies of the invention will appear from the description to follow. The invention is defined and pointed out in the claims.

Preferred embodiments of the invention are illustrated in the accompanying drawing, in which:

Fig. 1 is a bottom view of a cooking utensil embodying the features of my invention, the handle being partially broken away.

Fig. 2 is an enlarged central section on line 2—2 of Fig. 1.

Fig. 3 is a bottom view of a griddle type of cooking utensil embodying certain features of my invention.

Fig. 4 is a cross section on a line corresponding to line 4—4 of Fig. 3.

The embodiment of my invention shown in Fig. 1 is adapted for use as a frying pan or spider or as a cooking utensil generally, the side walls of the utensil being designed to receive a domed cover, not illustrated.

My cooking utensil as illustrated in Figs. 1 and 2 comprises the flat bottom 1 and side walls 2 of suitable depth with an outwardly extended flange-like rim 3 having an annular groove 4 therein adapted to receive the edge of the cover.

The bottom 1 is provided with an inner centrally disposed annular rib 5 of relatively small diameter and an outer annular rib 6 concentric with the rib 5 and being adjacent to the periphery of the receptacle.

Between these ribs 5 and 6 are uniformly disposed convolute ribs 7, there being a plurality of these ribs, four of them being shown in the embodiment illustrated. These convolute ribs are uniformly spaced and are arranged in overlapping relation with their inner ends 8 in uniformly spaced relation relative to each other and relative to the central annular rib 5. The outer ends 9 of these convolute ribs are also uniformly spaced relative to each other and relative to the outer annular rib 6.

As shown in Figs. 2 and 4, the ribs are of outwardly tapered cross section. With this arrangement of the ribs, there is a very uniform distribution of the metal of the ribs and it is found that the bottom is effectively reinforced without resulting in buckling or warping of the bottom when the utensil is heated. Further, the heat from the burner, usually more intense at the center of the burner, is effectively distributed throughout the bottom of the utensil.

The pitch of the ribs is substantial so that the heated gases and products of combustion can flow outwardly and it is found that the heating capacity of the utensil is really increased over that of utensils having small bottoms or ribs and as compared with utensils having bottoms provided with radial ribs. As stated, the tendency of the ribbed bottoms to warp or buckle when heated is largely overcome by the applicant's arrangement of the ribs.

The outer rib 6 serves as a baffle to prevent the too rapid escape of the heated gases and products of combustion and also the ribs provide a very stable bottom, the outer rib being especially effective to this end.

In Figs. 3 and 4, I illustrate my improvements as embodied in a flat griddle type of utensil 10, that illustrated being generally rectangular in form and having a flat top 11 surrounded by a drip channel 12. This structure has the same arrangement of annular and convolute ribs as the structure shown in Figs. 1 and 2, but owing to the rectangular shape of the utensil, radial ribs 13, 14 are provided extending to the rim 15, the lower edge of which, however, is in a plane above the bottoms of the annular and convolute ribs. This device has uses which will be readily understood by those skilled in cookery, for example, in baking pancakes or griddle cakes, and for various other uses which will suggest themselves.

As stated, the heat is very uniformly spread or distributed from the center outwardly and is effectively absorbed by the substantial amount of the metal of the bottom. The heat conducting surface is greatly increased over a flat or unribbed bottom and this results in a very great saving of fuel particularly where gas or electricity is the heating medium. Another advantage is that the sides of the ribs may be left unpolished without detracting from the appearance of the utensil and this slight roughness aids in the absorbing of heat.

A still further advantage is that the convolute or spiral grooves between the convolute ribs have no ends or corners to catch dirt and the utensil can easily be kept clean, as for example, by means of a steel brush or steel wool or other cleaners. Further, my improvements can be readily embodied in various types of utensils formed as castings, and while it is particularly desirable for use in utensils formed of aluminum or aluminum alloy, my improvements are not confined to units formed of such materials.

I have illustrated and described my improvements in certain practical embodiments thereof. I have not attempted to illustrate and describe other embodiments or adaptations as it is believed that this disclosure will enable those skilled in the art to embody or adapt the same as may be desired.

Having thus described my invention, what I claim as new and desire to secure by Letters Patent is:

1. A cooking utensil having a flat bottom provided with an inner centrally disposed annular rib of relatively small diameter and an outer annular rib adjacent the periphery of the bottom, and a plurality of spaced convolute ribs of uniform length arranged in overlapping relation with their inner ends adjacent but uniformly spaced from said inner annular rib and their outer ends adjacent but uniformly spaced from said outer annular rib, said convolute ribs comprising substantially one convolution, all the ribs being of outwardly tapered substantially uniform section.

2. A cooking utensil having a flat bottom provided with an inner centrally disposed annular rib of relatively small diameter and an outer annular rib adjacent the periphery of the bottom, and a plurality of spaced convolute ribs of uniform length arranged in overlapping relation with their inner ends adjacent but uniformly spaced from said inner annular rib and their outer ends adjacent but uniformly spaced from said outer annular rib.

3. A cooking utensil having a flat bottom provided with inner and outer concentric ribs, the inner rib being of relatively small diameter and centrally disposed, the outer rib being adjacent the side walls of the utensil, and a plurality of spaced convolute ribs arranged in overlapping relation with their inner ends uniformly spaced from said inner rib and relative to each other and their outer ends uniformly spaced relative to said outer rib and relative to each other, said convolute ribs being of substantial pitch.

4. A cooking utensil provided with a central circular bottom rib of relatively small diameter and an outer circular bottom rib substantially spaced from the central rib and concentric thereto, and a plurality of convolute ribs arranged in overlapping relation with their inner and outer ends uniformly spaced relative to each other and relative to said inner and outer annular ribs, said convolute ribs being of substantial pitch, the edges of the annular and convolute ribs lying in substantially the same plane.

5. A cooking utensil having a bottom provided with an inner centrally disposed annular rib of relatively small diameter and an outer annular rib of substantial diameter, and a plurality of spaced convolute ribs arranged in overlapping relation with their inner ends spaced from each other and adjacent but spaced from said inner annular rib and their outer ends spaced from each other and adjacent but spaced from said outer annular rib, said convolute ribs comprising substantially one convolution.

6. A cooking utensil having a bottom provided with an outer annular rib of substantial diameter, and a plurality of spaced convolute ribs arranged in overlapping relation with their inner ends spaced relative to each other and their outer ends adjacent but spaced from said outer annular rib, said convolute ribs comprising substantially one convolution, the edges of the several ribs lying in substantially the same plane.

7. A cooking utensil provided with inner and outer concentric bottom ribs, the inner rib being of relatively small diameter and centrally disposed, the outer rib being of substantially greater diameter than the inner rib, and a plurality of spaced convolute bottom ribs arranged in overlapping relation with their inner ends spaced from said inner rib and relative to each other and their outer ends spaced relative to said outer rib and relative to each other, said convolute ribs being of substantial pitch.

8. A cooking utensil having inner and outer concentric bottom ribs, the inner rib being of relatively small diameter and centrally disposed, the outer rib being of substantially greater diameter than the inner, and a plurality of spaced convolute ribs arranged in overlapping relation with their inner ends spaced from said inner rib and relative to each other and their outer ends spaced relative to said outer rib and relative to each other.

LEWIS G. HOWLETT.